Figure 4:
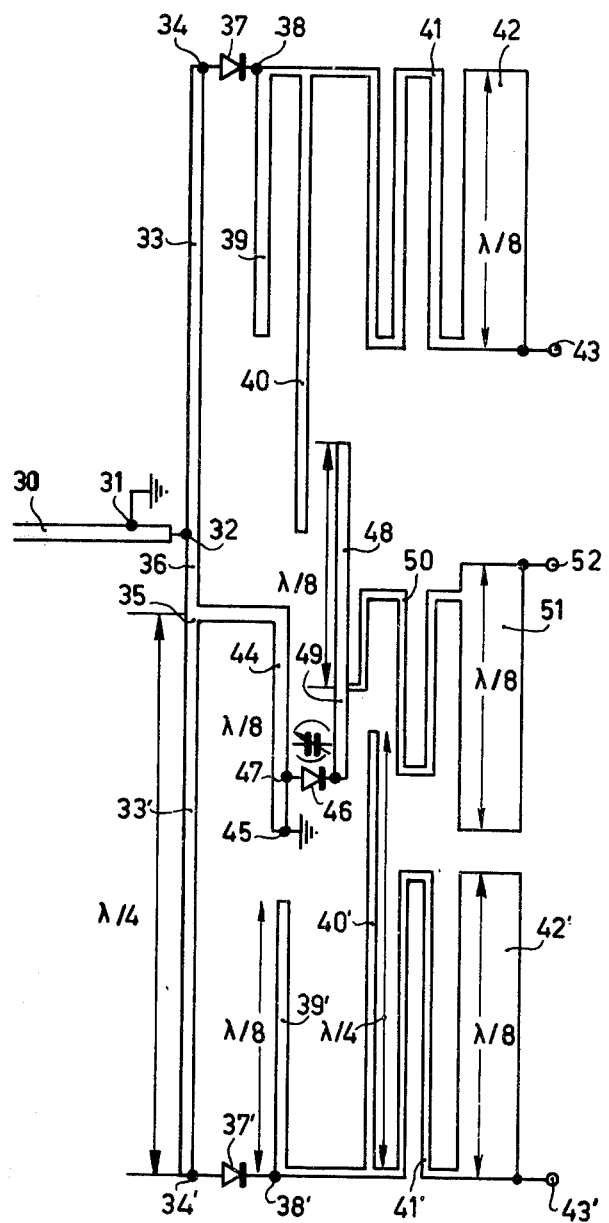

United States Patent [19]

Olsson et al.

[11] 4,019,181
[45] Apr. 19, 1977

[54] TRANSPONDER SYSTEM

[75] Inventors: Kjell Olow Ingemar Olsson, Jarfalla; Bengt Georg Loggert, Solna, both of Sweden

[73] Assignee: U.S. Philips Corporation, New York, N.Y.

[22] Filed: July 9, 1975

[21] Appl. No.: 594,206

[30] Foreign Application Priority Data

July 19, 1974 Sweden .............................. 7409425

[52] U.S. Cl. .............................. 343/6.5 SS; 325/9; 343/6.5 LC; 343/18 D
[51] Int. Cl.² .......................................... G01S 9/56
[58] Field of Search ....... 325/9; 343/6.8 R, 6.5 LC, 343/6.5 SS, 18 D

[56] References Cited

UNITED STATES PATENTS

| 3,098,971 | 7/1963 | Richardson | 325/9 |
| 3,299,424 | 1/1967 | Vinding | 343/6.8 R |
| 3,706,094 | 12/1972 | Cole et al. | 343/6.8 R |

*Primary Examiner*—Maynard R. Wilbur
*Assistant Examiner*—Richard E. Berger
*Attorney, Agent, or Firm*—Frank R. Trifari; George B. Berka

[57] ABSTRACT

A responder system in which incoming frequency $f_0$ is converted to a harmonic frequency, e.g. $2f_0$, by means of a non-linear element, for example a diode, which is connected between capacitance and inductance in two parallel-connected series resonant circuits, one of which is closely tuned to the incoming frequency $f_0$ while the other is closely tuned to the selected harmonic frequency. Incoming frequency $f_0$ is fed to the interconnected ends of the two resonant circuits, whereby both resonant circuits are excited at their respective resonance frequencies, and the harmonic frequency $2f_0$ is radiated back via a common antenna connected to the interconnected ends of the two series resonant circuits. When transmitting binary information by means of pulses at the harmonic frequency $2f_0$ the retransmitted pulses can be marked in certain pulse intervals by eliminating the resonance condition in the second resonant circuit ($2f_0$) during a part of the interval, so that a dip will be produced in the retransmitted pulse, while in other intervals the pulse is retransmitted continuously.

7 Claims, 6 Drawing Figures

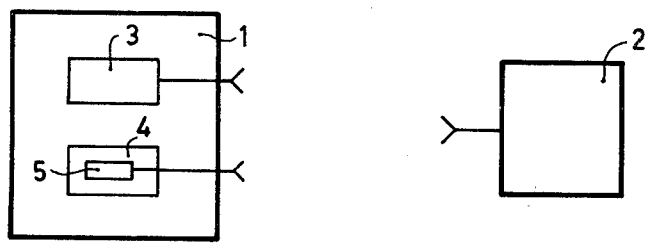
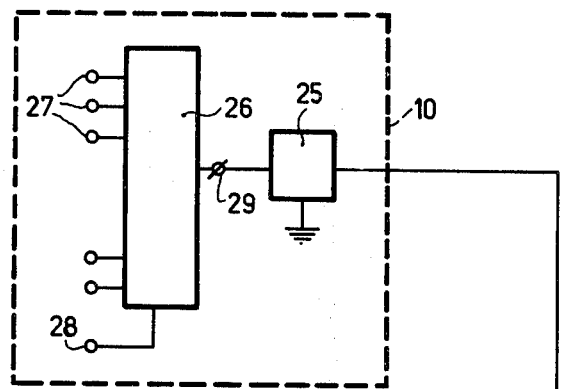
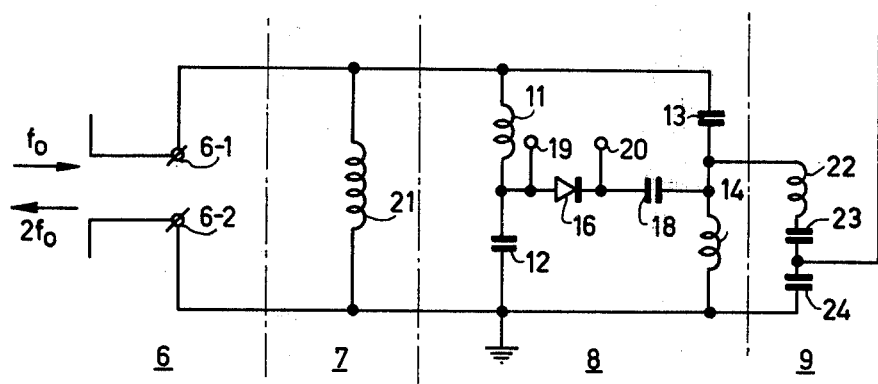
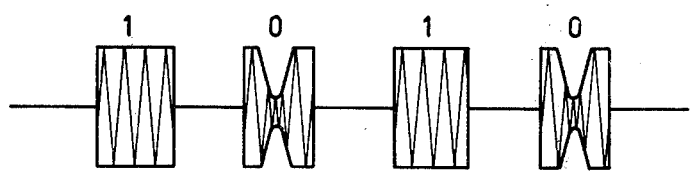

TRANSPONDER SYSTEM

The invention relates to a transponder system comprising an interrogator station which is provided with a transmitter and a receiver and comprising a responder station having common input and output terminals, the interrogator station being arranged for the wireless transmission of an interrogation signal in the form of a pulse train which has a given carrier frequency, the responder station comprising a first resonator which is coupled to the common input and output terminals for generating from the interrogation signal pulses received a reply signal which has a carrier frequency which is a harmonic of the frequency of the received carrier signal and in which the responder station comprises a modulator for modulating the reply signal in amplitude for the transmission of information.

Such a transponder system in which the modulator comprises an adjustable attenuating network connected between the common input and output terminals for adjusting the attenuation of the first resonator depending on the information to be transmitted is inter alia known from British Patent Specification No. 723,815. This manner of modulating has the disadvantage that not only the required modulation of the amplitude of the reply signal is obtained but that the received interrogation signal is also attenuated. For that reason the energy required for the modulator is obtained from a separate energy source so that the responder station is not passive. To eliminate this drawback it is known to transfer the supply energy for the modulator by wireless means generating a separate signal or to postpone the transmission of a reply signal until a complete pulse of the interrogation signal has been received and vice versa. It is also known to separate the receiving and the transmitting circuit of the responder station by using separate input and output terminals. However, these solutions require either a considerable increase in the required equipment or a low signal transmission speed.

Furthermore, the transponder system must be used in railway signalling systems, whereby the train is provided with the interrogator station and whereby a number of passive responder stations are placed along railtracks to send signalling information to the train. However, such rail-bound vehicles generate a large number of high level interference signals. This means that a modulation for the transmission of information wherein pulses of the reply signal are suppressed, is not suitable for use for rail-bound vehicles, due to an inadmissibly small signal-to-noise ratio. Therefore the railway companies demand that, in the transmission of binary coded information, the two binary signal values be transmitted by means of a pulse.

The invention has for its object to provide a simple transponder system which eliminates said disadvantages and which satisfies said requirements and which is particularly suitable for use in railway signalling systems.

The transponder system according to the invention is characterized in that at least one rectifier element having a non-linear characteristic, which is coupled with the first resonator is provided for generating said harmonic, the modulator being connected across the rectifier element for feeding energy to the modulator, and in that a tunable second resonator, which is coupled to the first resonator as well as to the modulator, is provided for modulating reply signal pulses in amplitude for part of the pulse duration, in accordance with the information to be transmitted whereby the oscillation having the given carrier frequency which is produced in the first resonator substantially not being affected by the modulation.

Figure 5:
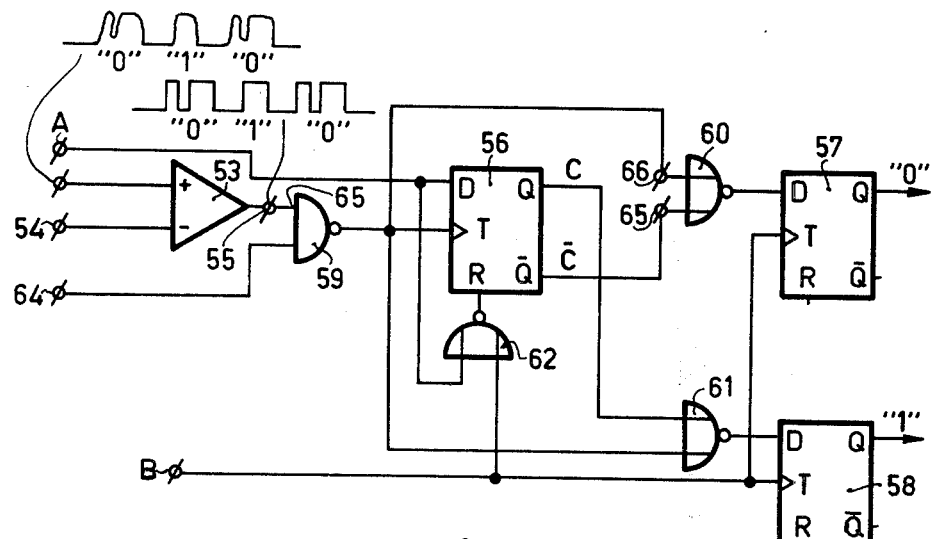
Figure 6:
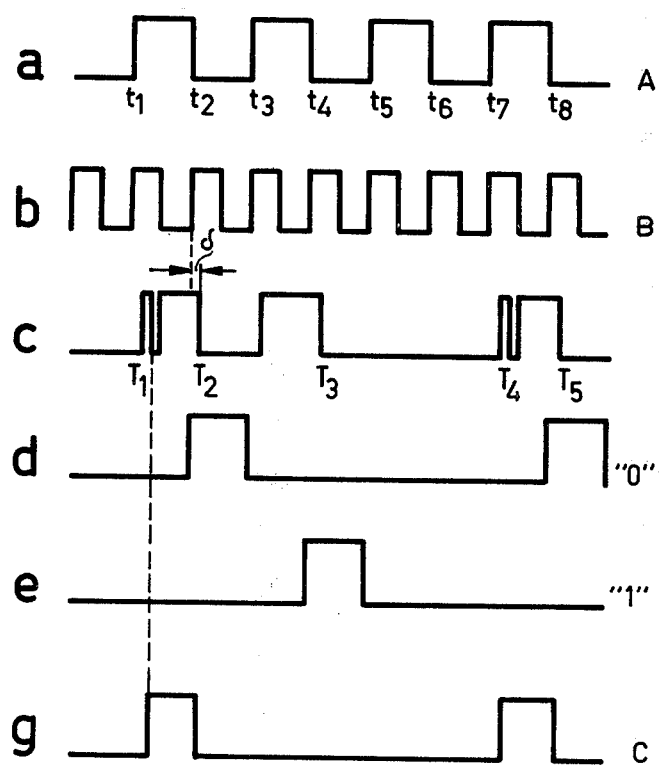

The invention and its advantages will be further explained with reference to the embodiments shown in the Figures, in which:

FIG. 1 is a block diagram of a transponder system,

FIG. 2 shows an embodiment of a responder station for use in a transponder system according to FIG. 1, FIG. 3 shows some signals generated by the responder station shown in FIG. 2, FIG. 4 shows an embodiment of part of the responder station for use in a transponder system shown in FIG. 1, FIG. 5 shows an embodiment of the demodulator for use in a receiver of an interrogator station of the transponder system shown in FIG. 1 and FIG. 6 shows some signals which may be produced in the demodulator shown in FIG. 4.

FIG. 1 shows a transponder system which comprises an interrogator station 1 and at least one passive responder station 2. The interrogator station 1 comprises in known manner a transmitter 3 for transmitting to the responder station 2 an interrogation signal in the form of a pulse train which has a carrier frequency $f_0$. This interrogation signal is converted in a manner described hereinafter to a reply signal which is characteristic of this responder station and transmitted to a receiver 4 of the interrogator station 1. This receiver comprises a demodulator 5 which demodulates a received reply signal in a manner described hereinafter.

FIG. 2 shows a responder station which is suitable for such an identification system and which comprises the following component parts:

an aerial 6, having common inputs and output terminals 6-1, 6-2;
a coupling circuit 7;
a first resonator 8;
a second resonator 9 and
a modulator 10.

As shown in FIG. 2 the first resonance device 8 consists of two series resonant circuits 11, 12 and 13, 14 connected in parallel and a diode 16 connected between the junctions between capacitance and inductance in the two resonant circuits. One of the resonant circuits 11, 12 is closely tuned to the incoming frequency $f_0$ and the other resonant circuit 13, 14 is closely tuned to the selected harmonic, for example $2f_0$. The rectified output is produced by means of a capacitor 18 connected in series with the diode 16 and terminals 19, 20 arranged on opposite sides of the diode 16 for feeding-out DC power. A coupling impedance is connected between the input and output terminals 6-1, 6-2, which coupling impedance consists in the shown example of an inductance 21 which is connected to the interconnected ends of the resonant circuits. The second resonance device 9 consists of a series resonant circuit comprising an inductance 22, a fixed capacitance 23 and a variable capacitance 24, e.g. a varactor. The input terminals and output 6-1, 6-2, can in turn be connected to an aerial for reception and transmission. Control information for the variable capacitance 24 is obtained from the modulator 10.

Operation is as follows.

An incoming signal at the frequency $f_0$ passes to the resonant circuits and will cause the first circuit 11, 12 to oscillate. Then high voltages mutually displaced by substantially 180° in phase will be set up across the capacitor 12 and the coil 11. These high voltages will cause a current of frequency $f_0$ to flow through the diode 16. As a result of the non-linear current-voltage characteristic of the diode the current through the diode will be deformed and will inter alia contain a high percentage of the second harmonic $2f_0$. As a result the second resonant circuit 13, 14 also will be caused to oscillate at its resonance frequency, which in the example is $2f_0$. The two resonance currents are substantially closed through the coil 21, which coil completes the resonant circuits and will determine the impedance transformation. The harmonic signal will be radiated via the antenna connected to the common input and output.

FIG. 2 also shows how a DC voltage can be derived from the frequency doubling diode 16, which is made possible in that the said capacitor 18, which blocks the DC current, is connected in series with the diode 16. The equipment connected across the diode 16, which equipment receives its operating voltage from the diode, is in the example constituted by the modulator 10. This device is assumed to have a high impedance. The coupling impedance 21 is then dimensioned such that it will match the input terminals 6-1, 6-2 which have a low impedance, to the circuit across the diode 16, which has a high impedance.

The harmonic signal, which is retransmitted from the responder statin towards the interrogator station, is assumed to comprise binary information in the shape of zeros and ones in different time intervals according to a given code. One of the binary digits, for example 0, can then be represented in that the retransmitted pulse is extinguished during a part of the time interval, while during a time interval which comprises the other binary digit, i.e. 1, the harmonic signal is retransmitted continuously. FIG. 2 shows how this can be achieved in a simple manner in that the resonance condition in the second resonant circuit in the said first time interval is eliminated by means of the series resonant circuit 22, 23, 24 connected across the inductance 14. In this series resonant circuit the capacitance 24 is variable and controlled with a voltage obtained from a signal generator, e.g. a sweep generator 25 included in the modulator 10, while the remaining elements are fixed. The value of the capacitance 24 is selected such in relation to the obtained sweep voltage from the modulator 10 that the circuit 22, 23, 24 will be in resonance condition at the frequency $2f_0$ for a certain value of the received sweep voltage. For example, 24 may be dimensioned such that, when no voltage is obtained from the sweep generator 25, the tuning frequency of the series resonant circuit 22, 23, 24 will be widely different from $2f_0$ and its influence upon the second resonance circuit 13, 14 will be negligible. On the other hand when a sweep voltage is obtained from the generator 25 the resonance frequency of the series resonant circuit 22, 23, 24 is swept such that during the sweep it will pass the value $2f_0$. In the circuit 22, 23, 24 the capacitor 23 will produce DC isolation for the voltage across 24 in the same manner as the capacitance 18 produces DC isolation for the voltage across the diode 16.

The sequence of ones and zeros is determined by a code unit 26 which receives control information in the shape of DC voltages at a number of control inputs 27. The interrogation signal is pulsed. The clock information for the code unit is derived from the received pulse signal via the rectifying diode 16 and is led to a clock input 28. At its output 29 the code unit delivers a pulse sequence containing the required reply code of ones and zeros. In the example given the binary sign 1 is represented by a voltage at the output 29, whereas the binary digit corresponds to a lower voltage 0, which does not trigger the sweep generator 25. This generator thus delivers no sweep voltage to the variable capacitance 24, which will retain its initial bias voltage during the whole interval. In this condition the series resonant circuit 13, 14 is, as mentioned, not influenced by the circuit 22, 23, 24 but all the time closely tuned to the second harmonic of the transmission frequency, which harmonic therefore will be retransmitted continuously during the interval.

During an interval, which will comprise the other binary digit, i.e. 0, the code unit delivers at its output 29 a voltage which starts the sweep generator 25. The sweep voltage from the generator 25 will result in that the resonant circuit 22, 23, 24 during the sweep will be driven to resonance at $2f_0$. The said series resonant circuit forms in this condition a low impedance for $2f_0$ and the power fed out at the harmonic frequency $2f_0$ will be low. When the sweep voltage approaches this condition, in which the resonant circuit 22, 23, 24 is tuned to $2f_0$, the amplitude of the oscillation in the series resonant circuit 13, 14 will successively decrease and will then again increase successively on cessation of the said condition, so that a dip will appear in the retransmitted harmonic signal. A reply pulse comprising such a dip thus will represent binary zero.

The shape of the reply pulses in the described equipment is shown in FIG. 3, in which the first and third pulses represent binary 1 and the second and fourth pulses represent binary 0.

The responder station can be extended to generate several harmonics by means of further diodes and associated resonant circuits, which are connected in the same maner as shown for the described circuit.

The circuit shown is symmetrical about an axis and corresponding parts in the two halves of the circuit have been provided with the same references but with a prime allotted to the references in the left-hand part.

Referring to FIG. 4 a microstrip line 30 (e.g. $Z_0 = 50$ $\Omega$), which is connected to earth at a point 31, leads from the antenna (not shown) to a point 32 on a microstrip line 33 (e.g. $Z_0 = 100$ $\Omega$). The line 33 has a length, measured from the end point 34 to a central point 35, which is equal to $\lambda/4$, where $\lambda$ is the wavelength corresponding to the frequency $f_0$ of the interrogation pulses transmitted from the interrogation station. The line 33 continues from the central point 35 in an equal microstrip line 33' of the same length $\lambda/4$ to an opposite end point 34'. To the point 35 the second resonance service to be described more fully hereinafter is connected. The part of the line 33, which is situated between the points 32 and 35, forms a small inductance and produces impedance matching (corresponds to 21 in FIG. 2).

The microstrip lines 33, 33' together form a halfwave resonator for the interrogation frequency $f_0$ and a full-wave resonator for the double interrogation frequency or reply frequency (corresponds both to 11, 12 and 13, 14 in FIG. 2).

Each end point 34, 34' of the microstrip line 33, 33' is connected via a diode 37, 37' to a point 38, 38' which for high frequencies is earthed. The earthing of the points 38, 38' is produced by means of two microstrip lines 39' and 40, 40' having one end connected to the said points 38, 38' and the opposite end open. One of the said lines 39, 39' has a length of $\lambda/8$ and serves as a quarter-wave stub for the double interrogation frequency or reply frequency $2f_o$. The second line 40, 40' has a length of $\lambda/4$ and serves as a quarter-wave stub for the interrogation frequency $f_o$.

The two diodes 37, 37' produce rectification and frequency doubling of the interrogation pulses at frequency $f_o$.

The points 38, 38' are connected via microstrip lines 41, 41' to broad microstrip line parts 42, 42' together forming low-pass filters which in turn are connected to output terminals 43, 43'. At said terminals 43, 43' the detected pulses from the diodes 37, 37' will appear. The microstrip line parts 42, 42' have a length of $\lambda/8$.

The second resonance device is, as mentioned, connected to the central point 35 on the microstrip line 33, 33'. This device has influence on the frequency $2f_o$ only but no influence on the frequency $f_o$. The cause of this is as follows.

The end points 34, 34' of microstrip line 33, 33' have high impedance relative to earth for the frequency $f_o$ (and also a relatively high impedance for the frequency $2f_o$) owing to the fact that a DC voltage is built up on the side of the diodes 37, 37' remote from the microstrip line 33, 33', which voltage is approximately equal to the maximum amplitude of the HF voltage in the point 34, 34', so that the diodes 37, 37' are driven to cut-off. As regards the frequency $f_o$ the central point 35 is situated at a distance of a quarter of a wavelength from the respective end point 34, 34' while the point 35 as regards the frequency $2f_o$ is situated at a distance of a half wavelength from the end points 34, 34'. The high impedance in point 34, 34' is therefore as regards the frequency $f_o$ transformed to a low impedance in the point 35 where the second resonant device is connected. Thus, the second resonance device has negligible influence on the $f_o$ signal. As regards the frequency $2f_o$, however, the high impedance in the points 34, 34' is transformed to a high impedance in point 35. The instantaneous impedance of the second resonance device connected to the point 35 can then influence the frequency $2f_o$.

The second resonance device (corresponding to 22, 23, 24 in FIG. 2) consists of a microstrip line 44 having one end connected to the said central point 35 on the line 33, 33' and its opposite end 45 earthed. The line 44 between 35 and 45 has a length of approximately $\lambda/8$, i.e. it serves as a quarter-wave stub for the frequency $2f_o$. The low impedance in the point 45 is therefore transformed as regards the frequency $2f_o$ to a high impedance in the point 35 (if the influence of the further resonance circuit to be described hereinafter can be neglected).

One terminal of a varactor 46 is connected to the microstrip line 44 in point 47. In the embodiment shown the point 47 lies relatively close to the earthed end point 45 and that part of the microstrip line 44 which lies between 47 and 45 represents an inductance. In parallel across this inductance lies the varactor 46, which has its opposite terminal connected to a microwave stub in the shape of a microstrip line 48. The free end of microstrip line 48 here is open and from a point 49 on line 48 a microstrip line 50 leads to a broad microstrip line part 51 having a length of $\lambda/8$ which line part 51 together with line 50 forms a third low lens filter which filter is connected to an output 52 of a not shown modulator. To the output 52 a signal from a signal generator of the modulator is adapted to be applied, which signal determines the instantaneous value of the capacitance of the varactor 46. In the embodiment shown the distance between point 49 and the open free end of microstrip line 48 is approximately equal to $\lambda/8$ and the said point 49 therefore serves as HF-earth for the frequency $2f_o$. The said inductance represented by the distance 45, 47 of the line 44 forms together with the capacitance of varactor 46 and the reactance (in this embodiment inductance) of microwave stub 48 a parallel resonant circuit. If this resonant circuit is in resonance for the frequency $2f_o$ the point 47 will have a high impedance, for this frequency $2f_o$ and the high impedance in point 47 is transformed by the line 44 to a low impedance in the point 35. In the absence of resonance in the said resonance circuit the low impedance in the earthed point 45 will, as previously mentioned, be transformed to a high impedance in the point 35. In the said first case, i.e. when the resonant circuit 45, 46, 47 and 48 is tuned to the frequency $2f_o$ and the point 35 has a low impedance, a great part of the power on the frequency $2f_o$ will be absorbed in the resonant circuit. The outcoupling of power at the frequency $2f_o$ will be low. In the said last case, when the resonance frequency of the resonant circuit is situated far away from $2f_o$, the outcoupling of power at the frequency $2f_o$ will be high.

If the retransmitted pulse is to be modulated the signal from the signal generator applied to the varactor 46 via the output 52 is controlled so that the resonance frequency of the resonant circuit is swept past the frequency $2f_o$ during a part of the interrogation pulse. The retransmitted pulse at the frequency $2f_o$ will then be amplitude modulated with a dip coinciding in time with the instant at which the resonance frequency is equal to $2f_o$.

Many modifications of the arrangement shown are possible. In particular the modulation resonant circuit can be modified in various manners. Thus, the varactor 46 can be connected to the microstrip line 44 at any point along the line and the microwave stub 48 can have any shape which is adapted to the actual type of varactor arrangement.

This demodulator is adapted to distinguish between pulses of the reply signal representing binary one and binary zero originally shaped as shown at the left in FIG. 5. One is in the given example represented by an uninterrupted pulse and zero by a pulse with a dip.

The pulses are first led to a pulse shaper in the form of a differential amplifier 53, in which they are compared in amplitude with a reference voltage $V_{ref}$ on an input 54. The reference voltage may for example be chosen to be equal to half the amplitude of the incoming pulses. The amplifier operates such that its output voltage is high when the amplitude of the input pulse exceeds the reference voltage and low when the amplitude of the input pulse is lower than the reference voltage. The reply signal will then be as shown at point 55 of FIG. 5. The shown demodulator is provided with three so-called D-flip-flops 56, 57 and 58 of equal construction, one NAND-gate 59 and three NOR-gates 60, 61 and 62. Each of the D-flip-flops has one trigger input T, one signal input D, one data output Q, one inverted data output $\overline{Q}$ and one reset input R. The operation of the D-flip-flops is that the voltage appearing at the signal input D at the instant when a pulse of a first reference signal is applied to the trigger input T, is transferred to the output Q. The voltage at Q remains on the assumed level until the next reference pulse, when new setting takes place etc. Thus, if the voltage at D is high at the instant when a reference pulse is applied to T, the output voltage at Q will go high or remain high, as the case may be, until the next reference pulse. Similarly, if the voltage at D is low when a reference pulse is applied, the output voltage at Q will be low and stay low. The signal appearing at the output $\overline{Q}$ is the inverse value of the signal at Q. The reference pulses are defined as the positive edges of pulses led to the trigger input T. Resetting of the flip-flops to rest position, i.e. the condition in which the voltage at output Q is low, occurs when the voltage at the reset input R goes high.

The operation of the whole device shown in FIG. 5 will now be described, reference being made to the time diagrams in FIG. 6.

A received reply signal shaped as shown at point 55 is fed to a first input 63 of a decision circuit realized by NAND-gate 59. This signal is also shown in the diagram c in FIG. 5. At a second input 64 gate 59 receives an enabling signal, which signal is high so as to open the gate 59, only if the signal-to-noise ratio S/N exceeds 15 dB. If the signal to noise ratio is lower than 15 dB the voltage at the second input 54 of gate 59 is low and the gate is closed. The signal-to-noise ratio can be determined by a signal-noise detector, not shown in the figure. This is done by comparing a voltage achieved by sampling during reception of a pulse and a voltage achieved by sampling in a pulse space. If the gate 59 is open the shaped reply signal arrives, after inversion, at the trigger input T of flip-flop 56. Owing to the inversion at the output of 59 the negative edges in the input shaped reply signal will serve as a trigger signal for 56. To the signal input D of flip-flop 56 is applied a first reference voltage pulse A of the shape as shown in diagram a. The pulses in signal A coincide in time substantially with the pulses in the shaped reply signal but are leading a small time period δ relative to the pulses in the said reply signal. The pulses in signal A are derived from and coincide in time with interrogation pulses in the transmitter 3 in the interrogator station shown in FIG. 1, while the reply signals are the reply pulses which are delayed a time period δ equal to the delay in the system.

As mentioned the negative flanks in the reply signal act as trigger signals for 56. In the shown example the first reply signal has the value 0 and thus has a dip. The first edge in this dip occurring at T1 acts as trigger pulse for 56 and as the voltage at input D (signal A shown in diagram a) in FIG. 6 is high at this moment T1 the voltage at output Q goes high. The signal at signal output Q of flip-flop DF1 is called C and is shown in the last diagram g in FIG. 6. The next trigger pulse for 56 occurs at the rear edge of the first reply signal pulse; time instant T2. Owing to the time delay δ the voltage at input D is low at this instant T2 and the voltage at output Q goes low. A pulse extending between T1 and T2 is obtained at output Q of flip-flop 56, as shown in the last diagram g in FIG. 6 (signal C). In the given example the second reply signal pulse is a one and has no dip. Only one trigger pulse for 56 is generated, namely at the rear edge of the pulse, time instant T3. At this instant the voltage at input D is low and the voltage at output Q remains low. The last reply signal pulse is again a 0 and a pulse is generated between T4 and T5 at output Q of 56 in the same manner as described for the first reply signal pulse. Thus, as shown in the last diagram g in FIG. 6 a C pulse is generated at output Q of 56 each time a reply signal pulse having a dip is fed to the device, while reply signal pulses without such a dip or missing reply signal pulses will not give rise to any pulses C at output Q.

According to the foregoing a C pulse at output Q of 56 indicates that a reply signal pulse with a dip representing binary 0 has been received. However, before this pulse is accepted as a true reply signal pulse of binary value 0 it is subjected to a further signal treatment, which is effected by means of gate 60 and flip-flop 59. For this purpose the inverted C signal $\overline{C}$ derived at output $\overline{Q}$ of 56 is led to a first input 65 of NOR-gate 60. To the second input 66 is applied the inverted reply input signal derived from the output of gate 59, while the output signal from 60 is led to the signal input D of flip-flop 57. A second reference signal B shown in the second diagram b in FIG. 5 is led to the trigger pulse input T of 57 and an output signal for the whole device representing binary 0 is taken from output Q of 57.

The signal B has as shown; double frequency as compared with the first reference signal A and is derived from this signal in known maner. This signal B has a positive edge coinciding both with the positive and negative edges in signal A. Thus, a trigger pulse for flip-flop 57 is generated at each edge in signal A (FIG. 6a); instants t1, t2, t3 ... t8. The condition required for the voltage at output Q of 57 to go high now is that the voltage is high at input D of 57 at instants coinciding with any of the trigger pulse instants t1, t2 .... t8. A condition for this in turn is that both input voltages ($\overline{C}$ and reply) of gate 60 are low. This only occurs if signal C at output Q of 56 is high simultaneously as the input reference signal (FIG. 6c) is high. The signal C at output Q of 56 is high as a result of the presence of a dip in the reply signal pulse and signal C remains high to the end of the reply signal pulse. In the example given the first reply signal pulse has a dip and a C signal is generated during the pulse. At trigger pulse instant t2 both the reference signal and C signal are high and the voltage at output Q of 57 goes high. It remains high until the next trigger pulse instant t3, when both C signal and reply signal are low.

The next reply signal pulse in FIG. 6 has no dip and no C pulse is generated. According to the foregoing the voltage at input D of flip-flop 57 cannot go high in the absence of a C pulse and no output pulse at Q of 57 is generated. This is also valid in case of a missing reply signal pulse. The last reply signal pulse in FIG. 6 has a dip and an output pulse is generated at output Q of 57 in the same manner as described for the first reply pulse.

Now assume that a negative edge like that appearing at T1 in FIG. 6 is caused by an interference in transmission. The flip-flop 56 cannot distinguish between correct negative edges representing dips in reply signal pulses and interferences, and the output voltage C at output Q of flip-flop 56 will go high and remain high. However, in case of an interference, at the next following trigger pulse instant for 57, for example t2, there will exist no reply signal at high level and the output voltage at output Q of 57 cannot go high. Thus 60 and 57 will block C pulses, which are caused by interferences, and only allow correct C pulses to give rise to output pulses from 57.

NOR-gate 61 and flip-flop 58 serve to generate an output pulse which represents binary 0, i.e. a reply signal pulse without a dip. 61 and 58 are connected in the same manner and fed with the same signals as the gate 60 and flip-flop 57 except that instead of the inverted signal $\overline{C}$ fed to gate 60 in the arrangement 60, 57 the non-inverted signal C is fed to the corresponding gate 61 in the arrangement 61, 58. The C pulse is as mentioned caused by a dip in the reply signal pulse and thus 58 will generate a pulse at its output Q in case of a reply signal pulse without dip in the same manner as described for 57 in case of a reply signal pulse with a dip.

In order to eliminate the risk that flip-flop 56 at start of the system assumes a condition in which the output voltage at Q is high and remains in this condition, the said flip-flop is repeatedly reset. Resetting is effected by means of the first and second reference signals A and B, shown in diagrams a and b in FIG. 6, which are led to the inputs of NOR-gate 62. Owing to the inversion at the output of 62 resetting will take place when both signals A and B are low. As can be seen from the diagrams in FIG. 6 this will occur when flip-flop 56 already normally is in its reset condition and the resetting thus will not disturb the described normal operation of 56.

What is claimed is:

1. A transponder system including an interrogator station which is provided with a transmitter and a receiver, said transmitter being arranged for wireless transmission of an interrogation signal in the form of a pulse train having a given carrier frequency, and a responder station comprising a common transmitting and receiving antenna connected to two terminals, a first resonator connected between said terminals and tuned to the incoming carrier frequency, a second resonator connected between said terminals and tuned to a harmonic of the incoming frequency, a rectifier element with a non-linear characteristic coupled between the first and second resonators to produce d.c. trigger pulses from the incoming signal and to excite said second resonator for retransmitting a reply signal at the harmonic frequency, a modulator triggered by said d.c. pulses from the rectifier element an including control means for eliminating and restoring the resonant condition in said second resonantor in response to a binary information signal which is fed into the modulator.

2. A transponder system as claimed in claim 1 wherein said control means includes a voltage controled resonator coupled to said second resonator to detune the same at a predetermined voltage.

3. A transponder system as claimed in claim 1, wherein said resonators are two series-resonant circuits which are connected in parallel and which are coupled with the common antenna, the first circuit being tuned to the given carrier frequency and the second circuit to the harmonic of this given carrier frequency, the rectifying element being connected to the junctions of inductors and capacitors of these series-resonant circuits.

4. A transponder system as claimed in claim 3, wherein a capacitor is connected in series with the rectifying element, the two series-resonant circuits being arranged in such a way that the capacitors of these circuits are connected in series between said terminals together with the series combination of the rectifying element and the capacitor.

5. A transponder system as claimed in claim 2, wherein the voltage controlled resonator comprises a series-resonant circuit which is connected across one of the elements of the second series-resonant circuit and which comprises a varactor, the modulator being provided with a signal generator connected across the varactor.

6. A transponder system as claimed in claim 1, wherein the carrier frequency of the reply signal is an even harmonic of the given carrier frequency, the responder station being constructed in mircrostrip technique while the first resonator comprises a ½λ open microstrip conductor, where λ is the wavelength associated with the given carrier frequency in the microstrip conductor, the responder station comprising two semiconductor elements and two low-pass filters, either semiconductor element being connected between one of the ends of the microstrip conductor and a low-pass filter and either low-pass filter being connected to the modulator, the second resonator comprising a ⅛λ microstrip conductor which is connected between the centre of the ½λ microstrip conductor and an earth terminal, a varactor one terminal of which is connected to a point of the ⅛ microstrip conductor, a further microstrip conductor of a length greater than ⅛λ and smaller than ¼λ of which one end is connected to the other terminal of the varactor and a third low-pass filter which is connected between a first spaced ⅛λ from the other end of the further microstrip conductor and an output of the modulator, whilst that part of the ⅛λ microstrip conductor which is situated between the earth terminal and the point to which the varactor is connected together with the varactor and with that part of the further microstrip conductor which is situated between the varactor and the connecting point of the third low-pass filter forms a parallel resonant circuit, the modulator comprising a signal generator by which during said part of the pulse duration the resonance frequency of the parallel resonant circuit is adjusted to the harmonic of the given carrier frequency under the control of a control signal supplied by the generator.

7. A transponder system as claimed in claim 1, wherein the receiver of the interrogator station comprises a demodulator which comprises a differential amplifier in which a reply signal received is compared with a reference voltage for supplying a first signal level when the reference voltage is exceeded by the received reply signal voltage and for supplying a second signal level which differs from the first signal level when the reference voltage is not exceeded by the received reply signal voltage, a first flip-flop which is provided with a trigger input, a signal input, a signal output, an inverse signal output and a resetting input, the trigger input being coupled with an output of the differential amplifier, the signal input being coupled with a transmitter of the interrogator station for supplying to it a first pulse-shaped reference signal which is derived from the interrogation signal, a first NOR gate circuit to which the first pulse-shaped reference signal and a second pulse-shaped reference signal derived therefrom which has a pulse-repetition frequency which is twice that of the first reference signal, are supplied and whose output is connected to the resetting input of the first flipflop, a second NOR gate circuit which is coupled with the output of the differential amplifier and which is connected to the inverse signal output of the first flipflop, a third NOR gate circuit which is coupled with the output of the differential amplifier and which is connected to the signal output of the first flipflop, a second flipflop and third flipflop which are identical to the first flipflop and to whose trigger inputs the second pulse-shaped reference signal is applied, the signal inputs of the second and third flipflops, respectively being connected to the outputs of the second and third NOR gate circuits, respectively, while the demodulated received reply signal is derived from the signal outputs of the second and third flipflops.

* * * * *